June 12, 1951     J. J. SANGER ET AL     2,556,399
VEHICULAR LOADING AND UNLOADING CONVEYER MECHANISM
Filed Aug. 23, 1947     3 Sheets-Sheet 1
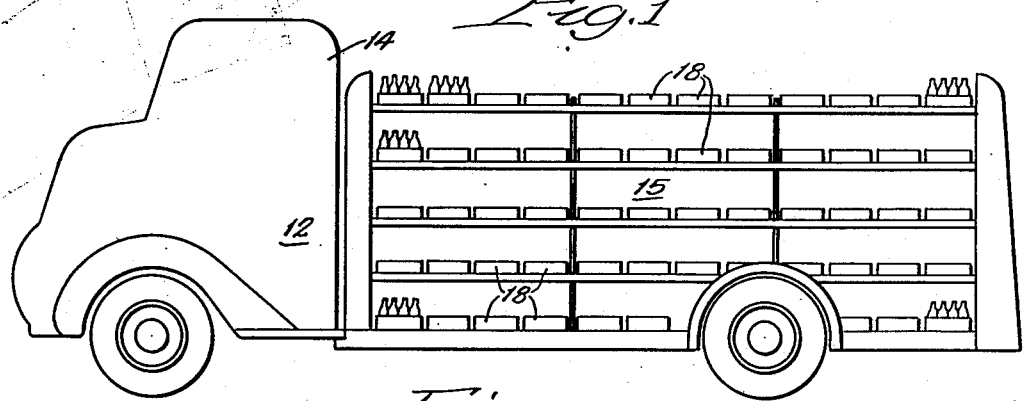
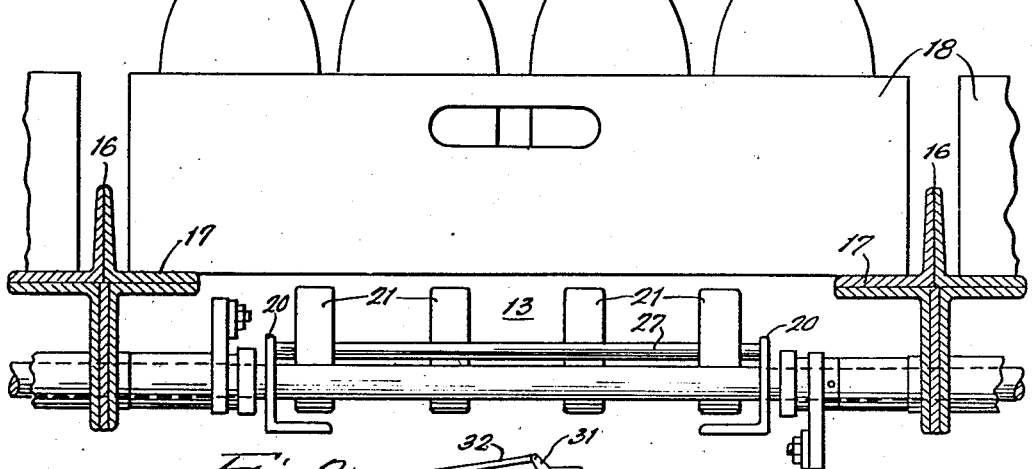
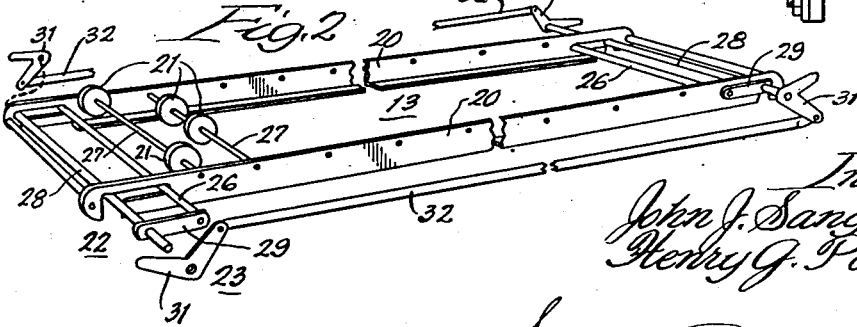

June 12, 1951  J. J. SANGER ET AL  2,556,399
VEHICULAR LOADING AND UNLOADING CONVEYER MECHANISM
Filed Aug. 23, 1947  3 Sheets-Sheet 2
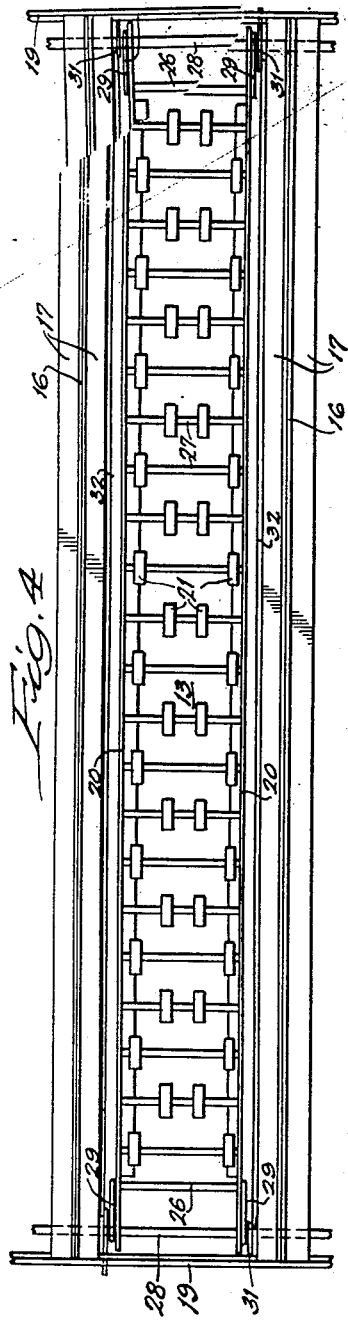
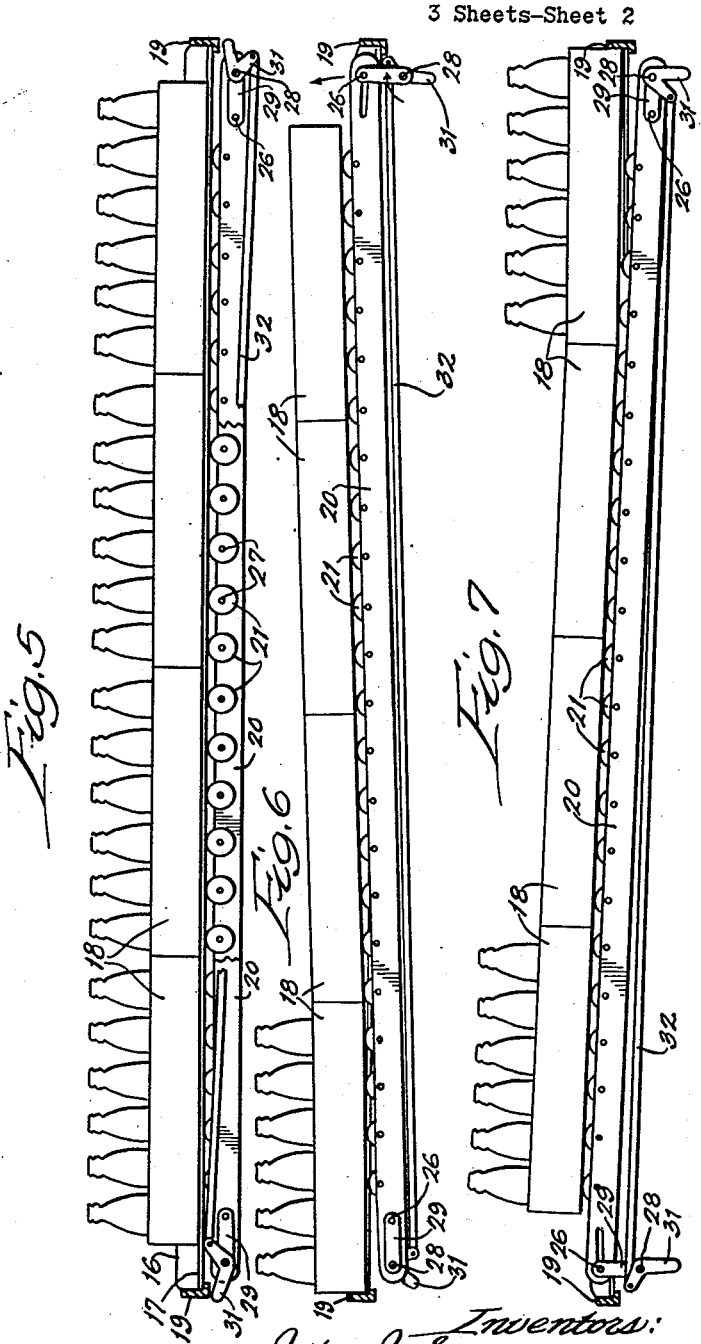
Inventors:
John J. Sanger and
Henry G. Poague,
By Evans, Pand & Anderson
Attorneys.

June 12, 1951  J. J. SANGER ET AL  2,556,399
VEHICULAR LOADING AND UNLOADING CONVEYER MECHANISM
Filed Aug. 23, 1947  3 Sheets-Sheet 3
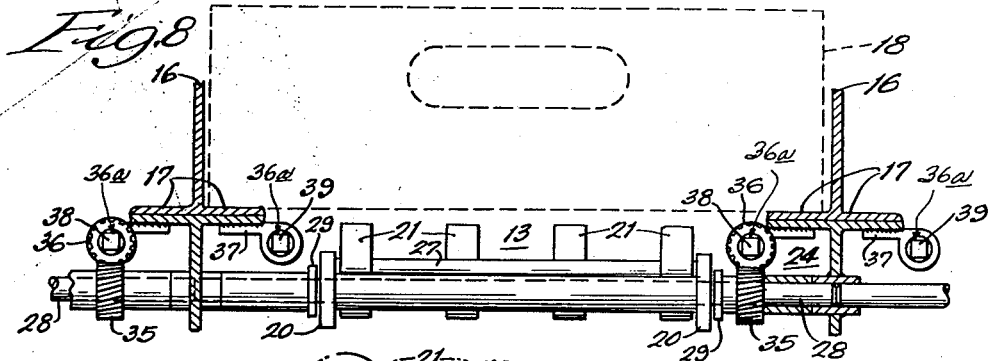
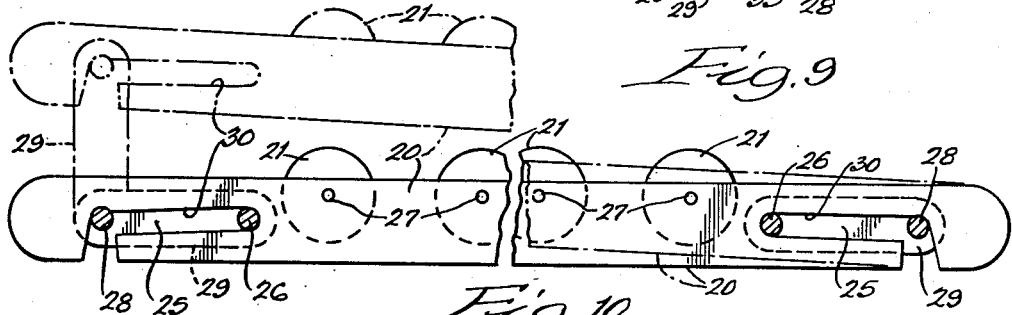
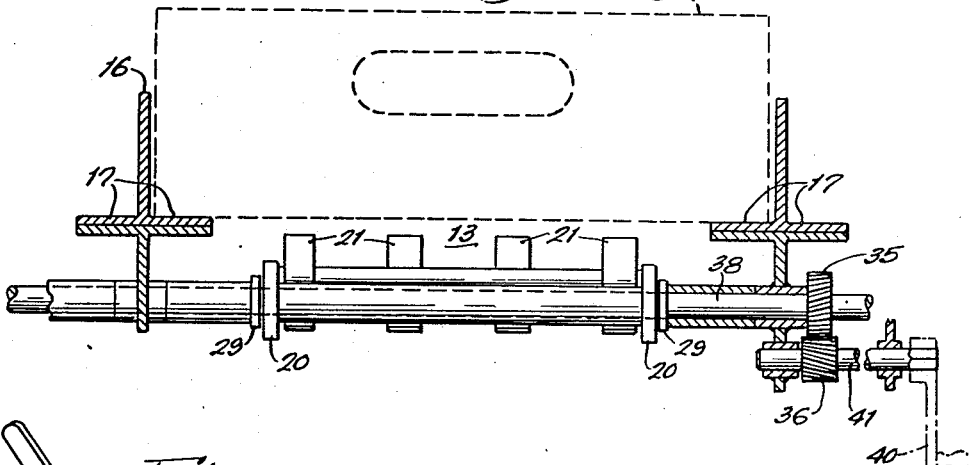
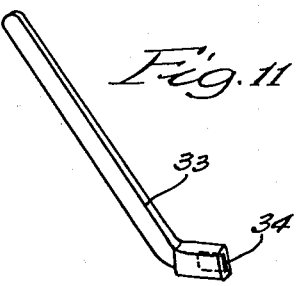
Inventors:
John J. Sanger and
Henry G. Poague,
By Soans Pond Anderson
Attorneys.

Patented June 12, 1951

2,556,399

UNITED STATES PATENT OFFICE 2,556,399

VEHICULAR LOADING AND UNLOADING CONVEYER MECHANISM

John Joseph Sanger, San Angelo, Tex., and Henry G. Poague, Kenosha, Wis.

Application August 23, 1947, Serial No. 770,222

2 Claims. (Cl. 214—84)

This invention relates to conveyor mechanisms for loading and unloading vehicles normally used for the transport of packaged goods, particularly where the vehicle travels over a route for the delivery and pick-up of standard-sized packages, such as, for example, cases of bottled beverages.

For the bottled-beverage industry, trucks are constructed with tiers of separate compartments—generally extending transversely of the truck chassis—each of which compartments is adapted to accommodate a number of standard size cases of the bottled beverage. For the soft drink industry, these trucks have been constructed with a body framework providing tiers of compartments each adapted to contain four cases. These trucks go out from the bottling plant loaded with cases of filled bottles. The truck travels a predetermined route. At each stop the operator delivers a certain number of cases of bottled beverages and picks up a certain number of cases of empty bottles.

Obviously, in the loading of such a truck it is a simple and easy matter to place the first case in a compartment. However, to permit other cases to be successively placed in the compartment, the first one has to be pushed to the other end of the compartment and three more cases have to be loaded and two pushed in from that side, or one more loaded from that side and two from the other side of the truck, the first one loaded on each side being pushed toward the middle of the compartment.

Unloading the cases either en route or at the bottling plant presents the problem in reverse. After removing one case from one end of a compartment, another one, or the three other cases have to be reached for from the one side, or one or two cases have to be removed from the opposite side of the truck.

When it is recognized that in the course of an average day 200 cases are loaded onto and removed from one truck, the amount of "reaching for" and "pushing of" cases is seen to require a considerable amount of human exertion. Moreover, in loading and unloading these trucks at the bottling plant, time is very often unproductively consumed in running the truck out from the platform, after loading cases to or unloading them from one side of the truck, so that a similar number of cases can be loaded to or unloaded from the opposite side of the truck.

The main objects of this invention, therefore, are, to provide an improved conveyor mechanism for trucks which greatly facilitates the loading and unloading of the truck; to provide improved conveyor mechanism of this kind which is particularly adapted for use on trucks designed for the transport of a large number of comparatively small standarized units, such for example as cases of bottled beverage; to provide improved means for disposing a conveyor mechanism of this kind at an angle to its normal horizontal support of the packages so as to cause the packages to travel by gravity along said conveyor mechanism to one end or the other of the supports; to provide an improved incline-disposing means adapted to permit the inclination of the conveyor mechanism in either direction from either side of the truck; to provide an improved conveyor mechanism and incline-disposing means of this kind which is particularly adapted for installation in each of the multi-case compartments extending transversely or longitudinally of the truck body; and to provide such an arrangement of an improved incline-disposing means as will permit the conveyor mechanisms for each of the several compartments of one tier to be set, individually or simultaneously, at an incline in either direction.

In the accompanying drawings:

Fig. 1 is a diagrammatic side elevation of a truck, of the type generally used for the transport of bottled beverages, for which a loading and unloading conveyor mechanism involving this invention is a most convenient accessory;

Fig. 2 is a blow-up perspective view of one form of a vehicular loading and unloading mechanism embodying this invention;

Fig. 3 is an enlarged transverse sectional detail, through one of the compartments of the truck shown in Fig. 1, indicating how a loading and unloading mechanism, embodying this invention is positioned in relationship to the ways whereon cases of bottled beverages are normally supported for transport;

Fig. 4 is a plan view of one of the truck compartments showing a loading and unloading mechanism, embodying this invention, arranged therein, the cases of bottled beverage being omitted;

Fig. 5 is a side elevation of the construction shown in Fig. 4 with the conventional number of beverage-bottle cases in position for transport;

Fig. 6 is a view similar to Fig. 5 but showing the conveyor mechanism elevated at the right-hand end through the manipulation of the operating mechanism at the left-hand end of the compartment, to permit the unloading of cases from the left-hand end, as viewed from Fig. 6;

Fig. 7 is a view comparable to Fig. 6 but with the left-hand end of the conveyor mechanism elevated through the manipulation of the operating mechanism at the left-hand end of the compartment to permit the loading of cases from the left-hand end, as viewed from Fig. 7;

Fig. 8 is a view similar to Fig. 3 but showing a modified form of the operating means for the incline-disposing device for the conveyor mechanism;

Fig. 9 is an enlarged fragmentary detail more clearly illustrating the action of the cam element whereby the conveyor mechanism is shifted into and out of its elevated position;

Fig. 10 is a view similar to Fig. 8 but showing a modification of the operating means which permits the conveyor mechanisms for the several compartments in a tier to be simultaneously elevated at one or the other ends; and Fig. 11 is a perspective view of a socket tool suitable for use with the bell-crank lever mechanism shown in Figs. 2, 5, 6, and 7 in effecting the elevation of the conveyor mechanism.

A truck 12 equipped with a loading and unloading mechanism 13, embodying this invention, comprises the usual chassis whereon is mounted a conventional body. The truck body is formed with the usual operator's cabin 14, behind which is arranged a framework 15 of angle iron providing several tiers of compartments extending tranversely of the truck chassis. The angle irons are of a shape and so assembled as to provide a very rigid structure wherein the several compartments are defined by vertical partitions 16 and ways 17 on the latter of which the bottled-beverage cases 18 are normally supported for transport. Other angle bars 19 extend along the sides of the framework 15 to provide end abutments for the several compartments.

This improved loading and unloading conveyor mechanism 13, for each of the compartments provided in the framework 15, comprises a support or sub-frame in the form of a pair of bars 20 whereon are mounted a series of rollers 21. At each end of each pair of bars 20 is arranged an incline-disposing device 22 with its operating means, either in the form of lever mechanism 23 or gear mechanism 24, the manipulation of which permits the bars 20 to be elevated at either end whereby the bottled-beverage cases 18 tend to move by gravity toward the opposite end of the respective compartments of the body framework 15.

The bars 20 are preferably of angle iron. Slots 25 are formed in each end thereof to receive a rod 26 forming a part of the incline-disposing device 22 to be described more fully presently. The rollers 21 are preferably in pairs mounted on rods 27, and may be journaled on the rods or fixed thereto and the rods journaled on the bars 20.

The incline-disposing device 22 for each pair of the bars 20 comprises a shaft 28 to which is fixed a pair of arms 29 which are connected to and spanned by a rod 26. In effect the shaft 28, the arms 29, and the rod 26 constitute a cam element wherein the rod 26 operating against the cam surface 30 (see Fig. 9) on each of the bars 20, formed by the slots 25, elevates and lowers said bars 20 as a result of the rotation of the shaft 28.

When the loading and unloading mechanism 13 for each of the several compartments is to be individually operated a shaft 28, with its pair of arms 29 and the cam-element rod 26, is journaled on the body framework 15 at each end of each of the compartments formed by said framework.

Where, as indicated in Fig. 10, it is desired to elevate all of the loading and unloading mechanisms 13 for a tier of compartments, the shaft 28 is continuous from one end of the truck body framework 15 to the other.

As noted above, the operating means for the incline-disposing device 22 may be either a lever mechanism 23, as shown in Figs. 2 through 7, or a gear mechanism 24, as shown in Figs. 8 and 10.

The lever-operating mechanism 23 comprises a pair of bell-crank levers 31 mounted on the shaft 28 at each end of each of the compartments. One lever of each pair is fixed to rotate with the shaft 28 whereas the other lever of the pair is free to rotate on the shaft 28. The bell-crank levers at the opposite ends of the compartments but on the same side thereof are connected together by means of a rod 32. Thus the bell-crank lever 31, which is fixed to a shaft 28, may be shifted to rotate such shaft so as to cause the cam rod 26 attached thereto to elevate and lower the bars 20 at the adjacent end of the respective compartment. By shifting the bell-crank lever at the same end of the compartment, which bell-crank lever is free on a shaft 28, the connecting rod 32 causes the bell-crank lever 31 at the opposite end of the compartment (which is fixed to that shaft 28) to shift the corresponding cam rod 26 so as to elevate and lower the opposite end of the roller-supporting bars 20.

A crank or hand-bar 33 (see Fig. 11) is provided with a socket 34 which fits over the exposed end of any of the bell-crank levers 31 so as to provide ample leverage for easily operating the bell-crank levers 31 to effect the elevation and lowering of the loading and unloading conveyor mechanism 13.

The gear-operating mechanism 24 may be arranged either for individual operation of the compartment mechanisms 13 or for the simultaneous operation of all of the mechanisms 13 for a tier of the compartments.

The arrangement of the gear mechanism 24 for individual operation of a conveyor mechanism 13 is indicated in Fig. 8. A pair of gears 35 and 36 are arranged at each end of each compartment but on opposite sides of the conveyor mechanism 13. The gear 35 is fixed to the shaft 28 whereas the gear 36 is fixed to a shaft 36a (Fig. 8) extending longitudinally of the compartment to the opposite end thereof. Each shaft 36a is journalled in brackets 37 secured to the angle irons which form the partitions 16 and ways 17. Squared heads 38 and 39 are formed on respectively opposite ends of the shafts 36a, to receive the socket of a crank 40 (Fig. 10) by which the gears are operated to turn the shafts 28 for the purpose of causing the elevating and lowering of the respective ends of the conveyor bars 20.

Where it is desired to simultaneously elevate the loading and unloading conveyor mechanisms 13 for each tier of compartments a shaft 28 is journaled on the framework 15 along each side of each tier of compartments A single pinion 35 is arranged at the outer end of each shaft 28 which meshes with a pinion 36 journaled on a jack shaft 41. In this case the gear 36 is made considerably smaller than the gear 35 so as to increase the leverage of the gear and lessen the amount of torque required to operate the shaft 28 for shifting all of the conveyor mechanisms 13 simultaneously.

The operation of the improved loading and unloading mechanism herein shown is as follows:

When it is desired to load a truck, such as shown in Fig. 1, it will be drawn up to the loading platform at the bottling works. Using either the handle 33 or the crank 40, as the form of the operating means may require, the operator will actuate the bell-crank lever 31, or the gear 35, which is fixed to the shaft 28, for each of the shafts 28 where the loading and unloading conveyor mechanism 13 for each compartment is individually operatable. The rotation of a shaft 28 will cause the swinging of the cam-element rod 26 to elevate the adjacent end of the roller-supporting bars 20. Thereupon the operator will place a case 18 of bottled beverage on the adjacent end of the conveyor mechanism 13. By gravity the case will move toward the opposite end of the compartment, being arrested by the abutment 19. A second case 18 then placed on the conveyor mechanism will move toward the first case. A third case 18 likewise placed on the conveyor will move toward the second case, leaving room for the fourth case. After the cases are all in place in a compartment, or in all of the compartments, the operator will use the handle 33 or the crank 40 to reverse the movement of the shaft 28 so as to lower the roller-supporting bars 20 to their normal position below the plane of the ways 17.

When it is desired to unload one or more cases, the operator will use the handle 33 to actuate the bell-crank lever 31 which is free on a shaft 28, or use the crank 40 with the squared end 39 of the rod 36a, so as to rotate the shaft 28 at the opposite end of the respective compartment. This will tend to cause the cases to gravitate toward that end of the compartment from which the operator has elevated the opposite end of the roller bars 20. Upon removing the first case the other three cases will move down so that the next case is at the end of the compartment. As each case is successively removed, the next case moves into position at the end of the compartment.

Thus, it will be seen that neither in loading nor in unloading of a truck of this kind is it necessary for the operator, standing at one end of the compartment, to either push the cases toward the other end or reach to remove them from the other end.

Other variations and modifications in the details of structure and arrangement of the parts may be resorted to within the spirit and coverage of the appended claims.

We claim:

1. In a loading and unloading mechanism of the class described the combination of a frame providing a compartment with ways for supporting a plurality of packages, a pair of bars connected together and mounting rollers on axes transverse to the length of said bars, a shaft at each end of said compartment, a pair of arms fixed to rotate with said shaft, a rod spanning and secured to said arms and contacting said pair of bars to have a cam action thereon when said shaft is rotated to swing said rod in an arc about said shaft, a pair of bell-crank levers for each of said shafts one of each pair being fixed to rotate with the respective shaft and the other being free to rotate thereon, and a rod connecting said other bell-crank lever of each of said pair with said one bell-crank lever of each of said pair, said one bell-crank lever of each pair being operable to cause a swinging of said first-mentioned rod to elevate the respective adjacent end of said pair of bars and said other bell-crank lever of each pair being operable to cause a swinging of said other rod to elevate the opposite end of said pair of bars, so as to dispose said bars to an incline whereby packages in said compartment will tend to gravitate toward that end of said compartment in the direction of which said bars are inclined.

2. In a loading and unloading mechanism of the class described, the combination of a main frame providing a compartment with ways for supporting a plurality of packages, a sub-frame having a plurality of rollers journalled thereon on axes transverse to said ways, the peripheries of said rollers being normally disposed beneath said ways, a pair of bell crank levers journalled on said main frame at each end of said compartment, one of each pair of said bell crank levers being connected to the adjacent end of said sub-frame, and a rod connecting the other bell crank lever of each pair with said one bell crank lever of the opposite pair, said one bell crank lever of each pair being operable to elevate the adjacent end of said sub-frame to elevate the adjacent rollers to dispose the peripheries of said adjacent rollers above said ways so as to contact the under-side of a package disposed over said ways, said other bell crank lever of each pair being separately but similarly operable to elevate rollers adjacent the opposite end of said sub-frame to raise the peripheries of said last-mentioned rollers above said ways whereby either of said pairs of bell crank levers may be manipulated to cause packages in said compartment to gravitate toward either end of said compartment.

JOHN JOSEPH SANGER.
HENRY G. POAGUE.

REFERENCES CITED

The following references are of record in the file of this patent:

UNITED STATES PATENTS

| Number | Name | Date |
|---|---|---|
| Re. 22,843 | Porter | Feb. 18, 1947 |
| 1,601,990 | Wann | Oct. 5, 1926 |
| 1,993,451 | Michaud | Mar. 5, 1935 |
| 2,021,503 | Fildes | Nov. 19, 1935 |
| 2,024,596 | Pfeiffer et al. | Dec. 17, 1935 |
| 2,087,846 | Jahn | July 20, 1937 |
| 2,199,097 | Chappelle | Apr. 30, 1940 |
| 2,301,639 | Onstott | Nov. 10, 1942 |
| 2,360,661 | Eddy et al. | Oct. 17, 1944 |
| 2,379,982 | Mitchell | July 10, 1945 |